United States Patent
Roy et al.

(10) Patent No.: US 10,001,983 B2
(45) Date of Patent: Jun. 19, 2018

(54) ROLLING VERSION UPDATE DEPLOYMENT UTILIZING DYNAMIC NODE ALLOCATION

(71) Applicant: salesforce.com, inc., San Francisco, CA (US)

(72) Inventors: Saptarshi Roy, San Francisco, CA (US); Daniel C. Silver, Los Altos, CA (US); Donovan Schneider, San Francisco, CA (US); Medha Pradhan, Fremont, CA (US); Ryan Lamore, Castro Valley, CA (US); Naveen Purushothama Rao, San Ramon, CA (US); Nicholas Geh, San Francisco, CA (US); Srirama Koneru, Redwood City, CA (US)

(73) Assignee: salesforce.com, Inc., San Francisco, CA (US)

( * ) Notice: Subject to any disclaimer, the term of this patent is extended or adjusted under 35 U.S.C. 154(b) by 9 days.

(21) Appl. No.: 15/221,496

(22) Filed: Jul. 27, 2016

(65) Prior Publication Data

US 2018/0032323 A1 Feb. 1, 2018

(51) Int. Cl.
*G06F 9/44* (2018.01)
*G06F 9/445* (2018.01)
*H04L 29/08* (2006.01)

(52) U.S. Cl.
CPC .............. *G06F 8/65* (2013.01); *H04L 67/34* (2013.01)

(58) Field of Classification Search
None
See application file for complete search history.

(56) References Cited

U.S. PATENT DOCUMENTS

| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |

(Continued)

OTHER PUBLICATIONS

Redis Cluster Specification, Redis, 2015.*

(Continued)

*Primary Examiner* — Insun Kang
(74) *Attorney, Agent, or Firm* — Holland & Hart LLP

(57) ABSTRACT

Methods are disclosed for dynamic node allocation for a server system that can automatically heal on failure—minimizing the need for static configuration—dynamically adjusting server resources to match load, and minimize end user wait times. The disclosed methods dynamically allocate nodes to increase capacity for a platform that accepts data queries. Additionally disclosed is a system for rolling version update deployment: workers maintain org lists of org-task-queues that they service; org-affinities between the workers and the org-task-queues require the workers to have access to local copies of immutable data sets to service org-tasks from the org-task-queues of the orgs that they service. A leader running on a worker implements a healing and balancing service that maintains worker redundancy, manages the workers' org-affinities to accumulate orgs on their respective org-lists. The leader implements messaging to the workers to update to a new software version and monitors completion of updates.

21 Claims, 10 Drawing Sheets

(56) References Cited

U.S. PATENT DOCUMENTS

| | | |
|---|---|---|
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,069,497 B1 | 6/2006 | Desai |
| 7,181,758 B1 | 2/2007 | Chan |
| 7,260,818 B1* | 8/2007 | Iterum ............... G06F 8/71 717/102 |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,603,483 B2 | 10/2009 | Psounis et al. |
| 7,620,655 B2 | 11/2009 | Larsson et al. |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,756,275 B2 | 6/2014 | Jakobson |
| 8,769,004 B2 | 7/2014 | Jakobson |
| 8,769,017 B2 | 7/2014 | Jakobson |
| 9,032,053 B2* | 5/2015 | Kosuru ............. H04L 41/082 709/221 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0144720 A1* | 6/2009 | Roush ............... G06F 8/65 717/171 |
| 2009/0165018 A1* | 6/2009 | Junqueira ........... G06F 9/5061 719/313 |
| 2009/0177744 A1 | 7/2009 | Marlow et al. |
| 2011/0218958 A1 | 9/2011 | Warshavsky et al. |

(56) References Cited

U.S. PATENT DOCUMENTS

| | | | |
|---|---|---|---|
| 2011/0219208 A1* | 9/2011 | Asaad | G06F 15/76 712/12 |
| 2011/0247051 A1 | 10/2011 | Bulumulla et al. | |
| 2012/0042218 A1 | 2/2012 | Cinarkaya et al. | |
| 2012/0233137 A1 | 9/2012 | Jakobson et al. | |
| 2012/0290407 A1 | 11/2012 | Hubbard et al. | |
| 2013/0036237 A1* | 2/2013 | Mutisya | G06F 8/65 709/238 |
| 2013/0204991 A1* | 8/2013 | Skjolsvold | G06F 9/5083 709/223 |
| 2013/0212497 A1 | 8/2013 | Zelenko et al. | |
| 2013/0247216 A1 | 9/2013 | Cinarkaya et al. | |
| 2014/0196021 A1* | 7/2014 | Cheng | G06F 8/65 717/173 |
| 2015/0113539 A1* | 4/2015 | Agarwal | G06F 9/5027 718/104 |
| 2015/0149635 A1* | 5/2015 | Rajagopalan | H04L 67/1014 709/226 |
| 2016/0062759 A1* | 3/2016 | Lu | H04L 43/0882 717/173 |
| 2016/0085543 A1* | 3/2016 | Islam | G06F 8/65 717/171 |
| 2016/0266938 A1* | 9/2016 | Suzuki | G06F 9/5083 |

OTHER PUBLICATIONS

High Availability Services with SAS® Grid Manager, Sas, Aug. 11, 2014.*

Huang et al., Load Balancing for Hybrid NoSQL Database Management Systems, ACM, 2015.*

Stine, Build self-healing distributed systems with Spring Cloud, Javaworld, May 2015.*

Database High Availability Overview, 4. High Availability Architectures and Solutions—Oracle Help Center, 2007.*

Su et al., A Dynamic Load Balancing Routing Algorithm for Distributed Wireless Sensor Networks, IEEE, 2007.*

* cited by examiner

700

722:

| Rack | Server Name | Load |
|---|---|---|
| Rack 1 | Worker1-CHI | 1, 2, 3, 4, 5, 6, 7, 8, 9, 10, 11, 12, 13, 14, 15, 16, 17, 18 |
| Rack 2 | Worker2-CHI | 1, 2, 3, 4, 5, 6, 7, 8, 9, 10, 11, 12, 13, 14, 15, 16, 17, 18 |
| Rack 3 | Worker3-CHI | 1, 2, 3, 4, 5, 6, 7, 8, 9, 10, 11, 12, 13, 14, 15, 16, 17, 18 |

742:

| Rack | Server Name | Load |
|---|---|---|
| Rack 1 | Worker1-CHI | 10, 11, 12, 13, 14, 15, 16, 17, 18 |
| Rack 2 | Worker2-CHI | 10, 11, 12, 13, 14, 15, 16, 17, 18 |
| Rack 3 | Worker3-CHI | 10, 11, 12, 13, 14, 15, 16, 17, 18 |
| Rack 4 | Worker4-CHI | 1, 2, 3, 4, 5, 6, 7, 8, 9 |
| Rack 5 | Worker5-CHI | 1, 2, 3, 4, 5, 6, 7, 8, 9 |
| Rack 6 | Worker6-CHI | 1, 2, 3, 4, 5, 6, 7, 8, 9 |

762:

| Rack | Server Name | Load |
|---|---|---|
| Rack 1 | Worker1-1-CHI | 10, 11, 12, 13, 14, 15 |
| | Worker1-2-CHI | 16, 1, 17, 18, 6, 7 |
| | Worker1-3-CHI | 2, 3, 4, 5, 8, 9 |
| Rack 2 | Worker2-CHI | 16, 17, 18, 10, 11, 12, 13, 14, 15 |
| Rack 3 | Worker3-CHI | 16, 17, 18, 10, 11, 12, 13, 14, 15 |
| Rack 4 | Worker4-CHI | 1, 2, 5, 6, 7, 8 |
| Rack 5 | Worker5-CHI | 1, 3, 4, 6, 7, 9 |
| Rack 6 | Worker6-CHI | 2, 3, 4, 5, 8, 9 |

Fig. 7

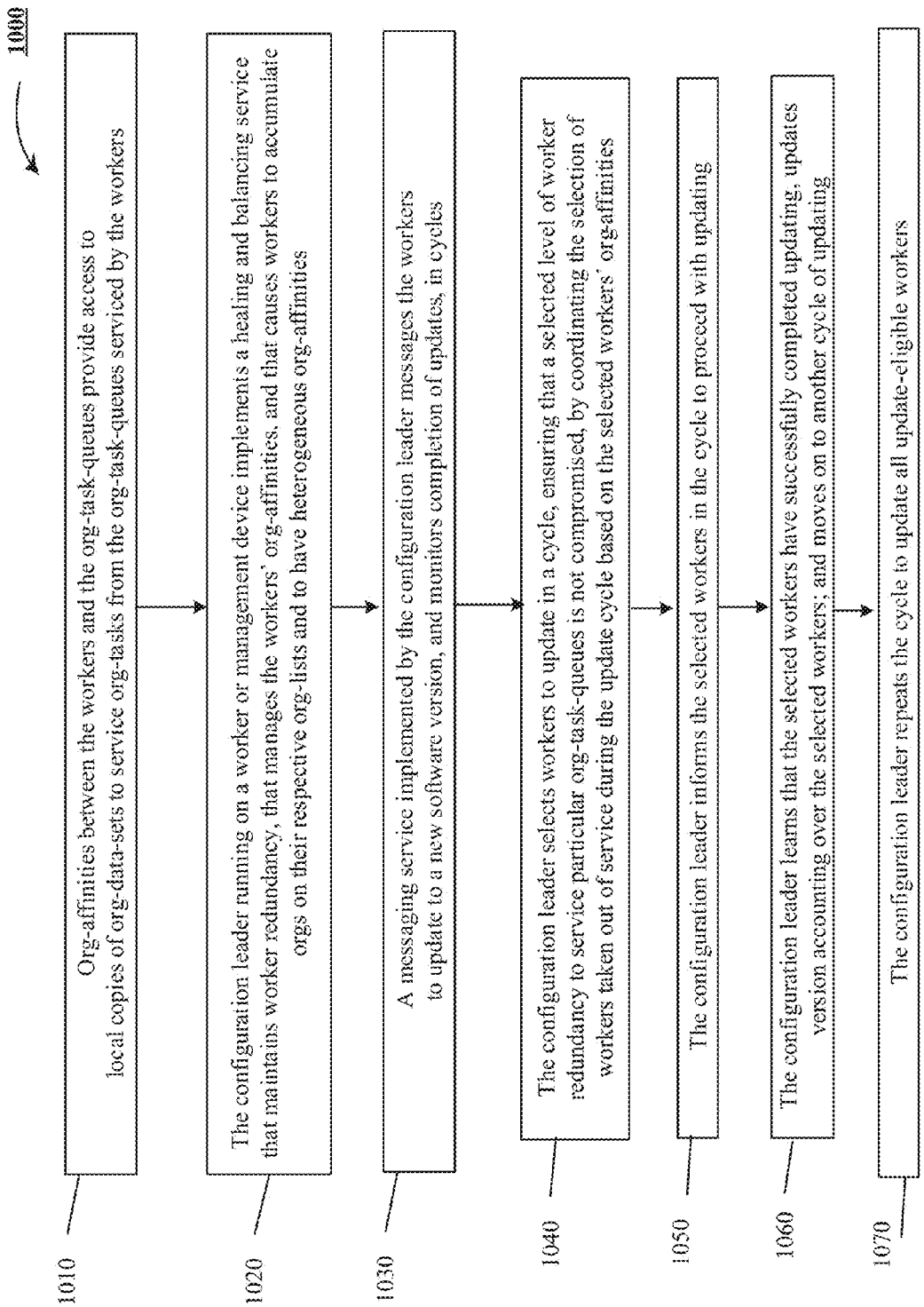

ROLLING VERSION UPDATE DEPLOYMENT UTILIZING DYNAMIC NODE ALLOCATION

RELATED APPLICATION

This application is related to U.S. patent application entitled "DYNAMIC ALLOCATION OF STATEFUL NODES FOR HEALING AND LOAD BALANCING" filed concurrently Ser. No. 15/221,486. The related application is hereby incorporated by reference for all purposes.

FIELD OF THE TECHNOLOGY DISCLOSED

The field of the disclosed technology is dynamic node allocation for delivering business analytics live, for large volumes of data—with dynamic visualization of data from huge datasets, for creating compelling dynamic answers for businesses.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed inventions.

Both developers and end users are dealing with large numbers of clients and huge data volumes, popularly referred to as "Big Data" in today's world. Web applications that serve and manage millions of Internet users, such as Facebook™ Instagram™, Twitter™, banking websites, or even online retail shops, such as Amazon.com™ or eBay™ are faced with the challenge of delivering information as fast as possible so that the end users can be provided with a real-time experience.

Businesses need the ability to query and to view query results in real time, large data sets being analyzed, in order to make informed business decisions. An enterprise system that provides business analytics live, for large volumes of data, performs visual data analysis and live data rendering, with flexible display options for analyzing the data and conveying analysis results. Workflow handling for queries is a significant consideration when configuring server node allocation—to optimize for speed and minimize the expense of providing live business analytics.

Existing worker node clusters for an example enterprise system operate as described next. Requests enter the system via a load balancer and get routed to one of a pool of several data structure server nodes. In one implementation, the data structure servers may be Redis nodes. Requests for a given org are hashed to a specific queue number and placed on that queue. Each worker node is assigned a fixed set of queues to monitor. For example, worker one on rack one might be assigned queues 1, 5, 7 and 9. Thus, worker one will service any requests for org IDs that get hashed to one of those queue numbers. To meet the need for assured reliability, at any time of any day, at least three backend servers are configured to monitor the Redis node assigned to process the generated queue. One of the backend servers picks up the work, processes it, and provides results. To ensure availability and maximize throughput, all workers listen to their assigned queues on all Redis nodes.

A salient issue for node configuration is how to spread queue assignments among the nodes available in the backend system. Existing systems are configured by manually running a configuration tool that extracts, from a database that contains a reliable list of information about the hardware, host server systems and their locations—for example, what server is where, on which racks. This configuration data gets extracted from the database, to produce a static set of configuration files, per data center. The configuration files of attribute-value pairs explicitly describe which server is going to handle which queue. In one implementation, the attribute-value pairs can be expressed in JSON, and the JSON results are usable as input to a revision control system, such as PREFORCE. After going through a coordinated release process, including obtaining the necessary signoffs, a series of server restarts can be carefully orchestrated to make changes to the configuration of the backend server nodes. The generated configurations are written in stone until new configuration files are deployed, which requires a repeat of the process just described.

The existing configuration approach, described above, for spreading queue assignments for big data among the nodes in the backend, is limited. Any configuration change, including adding additional server capacity, removing server capacity from the cluster, or reallocation of queues to better service hotspots in the system, requires a full release pipeline.

If any server in the system goes down for any reason, then the orgs that would have hashed to those queues go into degraded mode. The only available fix is for a human to take action and fix the node. Therefore, nodes operate very much as pets, instead of as cattle. If the system loses multiple nodes with queue overlaps, the service may become entirely unavailable for a set of orgs even if plenty of usable capacity is available in the cluster of servers. The requirement for a release cycle to implement configuration changes results in a lack of runtime adaptability, so that every single server gets treated like a precious pet, instead of the preferable perspective of having "cattle". That is, if a server goes down, ideally a different server would be substituted without a need to nurse the "pet" back to health before proceeding.

For the system described above, because node allocation is a slow and manual process, it is impossible to maximize hardware utilization for the end user's benefit. A large org could be experiencing a very high load with three servers running at maximum capacity, while another fifty servers are doing very little. Temporarily shifting resources around to better balance the load could greatly improve the average end user experience, but the existing configuration system for servers is inflexible at runtime. There is no ability to employ underutilized hardware to adapt to performance hotspots.

Therefore, an opportunity arises for dynamic node allocation for a server system that can automatically heal on failure—a system that minimizes the need for static configuration and is capable of dynamically adjusting server resources to match load, and minimize end user wait times. The disclosed technology relates to dynamically allocating nodes to increase capacity for a platform that accepts data queries and completes ultra-fast, ad-hoc data exploration and faceted navigation on integrated, heterogeneous data sets. The analytic data structures, also referred to as "edgemarts," are compressed data forms produced from transactional databases, which represent specific form functions of transactional database objects. Sometimes analytic data structures are produced by merging data from multiple database systems or platforms. For instance, prospect and opportunity closing data may come from one enterprise system and order fulfillment data can come from a software-as-a-system. An analytic data structure may combine sales and fulfillment data for particular opportunities, merging data from systems that run on different database platforms, in separate applications from different vendors, applying divergent security models. Dozens of analysts may work on subsets of an overall analytic data structure, both for periodic and ad hoc investigations.

SUMMARY

A simplified summary is provided herein to help enable a basic or general understanding of various aspects of exemplary, non-limiting implementations that follow in the more detailed description and the accompanying drawings. This summary is not intended, however, as an extensive or exhaustive overview. Instead, the sole purpose of this summary is to present some concepts related to some exemplary non-limiting implementations in a simplified form as a prelude to the more detailed description of the various implementations that follow.

Disclosed systems and methods are usable for dynamic allocation of stateful nodes for healing and load balancing. A disclosed system of networked racks with management devices and worker devices includes sufficient management devices to establish a redundancy factor and having management devices redundantly located in disjoint racks. The disclosed system responds to querying devices that query immutable data sets for orgs to which the querying devices belong; and the system handles the queries and the immutable data sets based on org-affinities. An org-affinity is implemented by data structures linking allocated workers that run on the worker devices and service the queries, with each allocated worker using a configuration agent to manage the worker's org-affinities. Immutable data sets belong to orgs, the immutable data sets are cached locally to the allocated workers, and the allocated workers listen to org-task-queues. Org-tasks are received by the allocated workers from the org-task-queues, and the allocated workers report status updates as they process the org-tasks. The disclosed system is further organized with redundant workers allocated to service particular org-task-queues, with the redundant workers for a particular org-task-queue selected to run on worker devices in disjoint racks; and a leader process runs on one of the management devices or worker devices. The leader process dynamically allocates workers to the org-task-queues and targets the workers to obtain and locally cache the immutable data sets used to respond to tasks in the org-task-queues. Management devices refer to the hardware on which a leader process, org-task-queue and configuration store management can be implemented.

The disclosed technology also includes a system with rolling version update deployment, which includes workers on a set of devices in the system, that maintain lists of org-task-queues to be serviced by the workers. Org-affinities between the workers and the org-task-queues provide access to local copies of org-data-sets to service org-tasks from the org-task-queues of the orgs that they service; a configuration leader running on a worker or management device implements a healing and balancing service that maintains worker redundancy, that manages the workers' org-affinities, and that causes workers to accumulate orgs on their respective org-lists and to have heterogeneous org-affinities, such that two workers both servicing a first org will have different lists of org-affinities. The configuration leader implements messaging to the workers to update from a legacy software version to a new software version and implements monitoring of completion of updates, in cycles: the configuration leader selects workers to update in a cycle, taking care that a selected level of worker redundancy to service particular org-task-queues is not compromised, by coordinating the selection of workers taken out of service during the update cycle based on the selected workers' org-affinities; the configuration leader informs the selected workers in the cycle to proceed with updating; and the configuration leader learns that the selected workers have successfully completed updating, updates version accounting over the selected workers; and moves on to another cycle of updating; and the configuration leader repeats the cycle to update all update-eligible workers.

Other aspects and advantages of the technology disclosed can be seen on review of the drawings, the detailed description and the claims, which follow.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 7 shows a load balancing example of workers across racks, as the number of racks or number of workers changes.

FIG. 10 shows an overview of the flow for a method for implementing rolling version update deployment.

DETAILED DESCRIPTION

Introduction

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Existing node allocation approaches for spreading queue assignments for big data among the server nodes in a data center are limited: even the smallest server configuration change requires a full release pipeline, which is slow and expensive. Additionally, data center operations need to be able to plug in or remove server hardware and the system needs to be able to adjust.

The disclosed technology includes methods and systems for dynamically allocating nodes to increase capacity for a platform. The importance of any single server can be minimized, and static configuration can be limited to what is needed to support the configuration structure.

Enterprise multi-tenant cloud-based entities need to be able to respond to shifts in customer demand in near real time, so need an ability to employ underutilized hardware to adapt to performance hotspots. That is, a demand exists for being able to grow and shrink the hardware pool for a data center by adding servers, as needed, or removing some servers from service. In a static configuration, some servers will be over-extended while other servers sit underutilized. In one example, at ten am on a Monday, a group of insurance and financial services companies, such as an insurance conglomerate, must run an extensive number of reports. This scenario motivates the need to be able to dynamically adjust resources to match changing conditions and load, to minimize end user wait times.

Runtime adaptability also requires that a single server can be treated like a head of cattle instead of being treated like a precious pet. That is, if a server goes down, a different server can be substituted without a need to nurse the precious pet back to health in real time.

The disclosed dynamic node allocation environment for an analytics platform, described next, is usable to make it possible for data centers to automatically heal when a failure occurs, so they can deliver dynamic visualizations of data from huge datasets, for creating compelling dynamic answers for business enterprises. For some implementations of the disclosed dynamic node allocation environment, the system collects metrics about the state of each member of the cluster of servers, and can make the metrics available to external monitoring systems used by operations personnel.

The disclosed dynamic node allocation also makes it possible for system upgrades for a cluster of servers to be coordinated as rolling code upgrades across the cluster, without any user-facing down time, and without any human intervention other than choosing to initiate a release via a user interface.

Dynamic Node Allocation Environment

Figure 1:
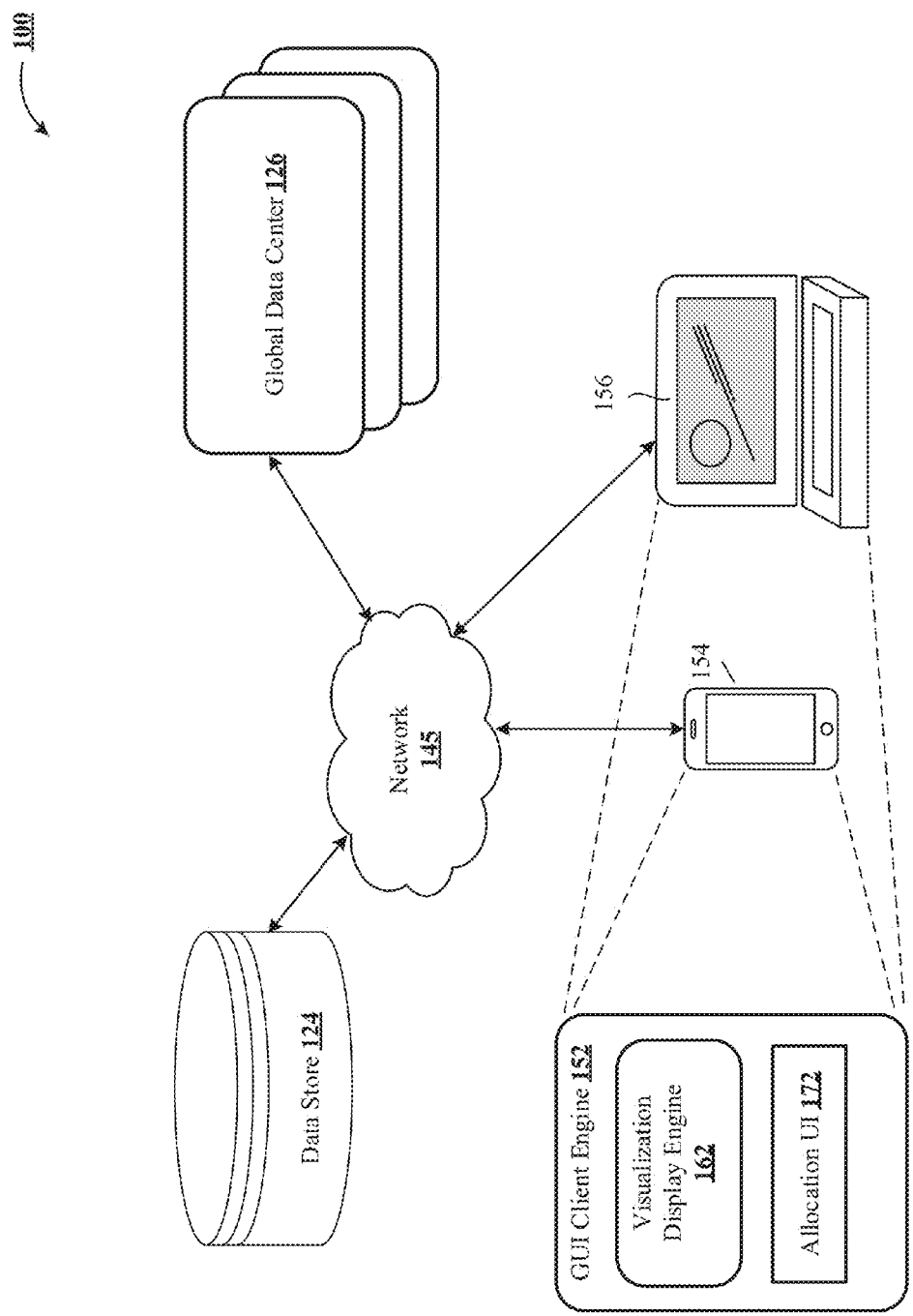
FIG. 1 illustrates an example environment capable of implementing dynamic allocation of stateful nodes for healing and load balancing.

FIG. 1 shows an architectural level schematic of an environment for dynamic allocation of stateful nodes for healing and load balancing—dynamically allocating nodes for delivering analytics for enterprise users. Because FIG. 1 is an architectural diagram, certain details are intentionally omitted to improve the clarity of the description. FIG. 1 includes global data center 126, GUI client engine 152 and data store 124. Global data center 126 is described in detail infra, relative to FIG. 2. Additionally the system includes network 145, mobile device user interface 154 and computer device user interface 156. GUI client engine 152 includes visualization display engine 162, which updates the display for end users, to reflect live business analytics query results for large volumes of data, with flexible display options for analyzing the data and conveying analysis results. Additionally, GUI client engine 152 includes allocation UI 172, which includes a user interface for human-triggered dynamic reconfiguration, such as choosing to allocate more capacity for a specific client for a period of time. In some implementations, allocation UI 172 can include features for selecting deployment options for system upgrades.

Data store 124 includes read-only datasets, with attributes of multiple users, usable for querying and viewing query results in real time, for large data sets being analyzed—including datasets extracted from multi-tenant CRM computing services on a batch basis, in one example. The data extracted from large data repositories can be compiled into analytical read-only data and stored in data store 124, and is usable to create "raw" datasets—read-only data structures for analytics—that can be augmented, transformed, flattened, etc. and published as customer-visible datasets for business entities.

Data store 124 can be implemented using a general-purpose distributed memory caching system. In some implementations, data structures can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object oriented database management systems (OODBMSs), distributed file systems (DFS), no-schema database, or any other data storing systems or computing devices. Analytical, read-only databases can implement response times of under two seconds when searching over twenty million records and compiling aggregate statistics from selected records.

In some implementations, user computing device 164 can be a personal computer, a laptop computer, tablet computer, smartphone or other mobile computing device, personal digital assistant (PDA), digital image capture devices, and the like. In some implementations, user mobile device 165 can be a tablet computer, smartphone or other mobile computing device, personal digital assistant (PDA), digital image capture devices, and the like.

GUI client engine 152 can take one of a number of forms, running in a browser or as an application, including user interfaces, dashboard interfaces, engagement consoles, and other interfaces, such as mobile interfaces, tablet interfaces, summary interfaces, or wearable interfaces. In some implementations, it can be hosted on a web-based or cloud-based server in an on premise environment. In one implementation, GUI client engine 152 can be accessed from a browser running on a computing device. The browser can be CHROME™, INTERNET EXPLORER™, FIREFOX™, SAFARI™, OPERA™, ANDROID™, BLACKBERRY™ and the like. In other implementations, GUI client engine 152 can run on a computer desktop application.

Network 145 can be any network or combination of networks of devices that communicate with one another, and communicate among the data stores, servers, and engines described herein. For example, network 145 can be implemented using one or any combination of a LAN (local area network), WAN (wide area network), telephone network (Public Switched Telephone Network (PSTN), Session Initiation Protocol (SIP), 3G, 4G LTE), wireless network, point-to-point network, star network, token ring network, hub network, WiMAX, Wi-Fi, peer-to-peer connections like Bluetooth, Near Field Communication (NFC), Z-Wave, ZigBee, or other appropriate configuration of data networks, including the Internet. In other implementations, other networks can be used such as an intranet, an extranet, a virtual private network (VPN), a non-TCP/IP based network, any LAN or WAN or the like.

In other implementations, environment 100 for dynamically allocating nodes for delivering analytics for enterprise users, multi-tenant cloud applications may not have the same elements or components as those listed above and/or may have other/different elements or components instead of, or in addition to, those listed above, such as a web server and template database. The different elements or components can be combined into single software modules and multiple software modules can run on the same hardware. Communication between component-driven multi-tenant cloud applications and application servers is considered at multiple levels in the data flow for a system; one example is described next.

The disclosed technology for dynamic node allocation for a server system that can automatically heal on failure includes a static configuration component that causes pre-selection of specific nodes in some servers to run an org-status store for maintaining configuration information, naming, providing distributed synchronization, and providing group services for the servers in the rack. In one implementation, the org-status store can be implemented as a Zookeeper cluster that includes sets of servers working together, including a server's root node. The Zookeeper file system is organized as a tree of nodes referred to as znodes, each of which has values within, usable for coordination among services. An example implementation is described in detail infra.

Figure 2:
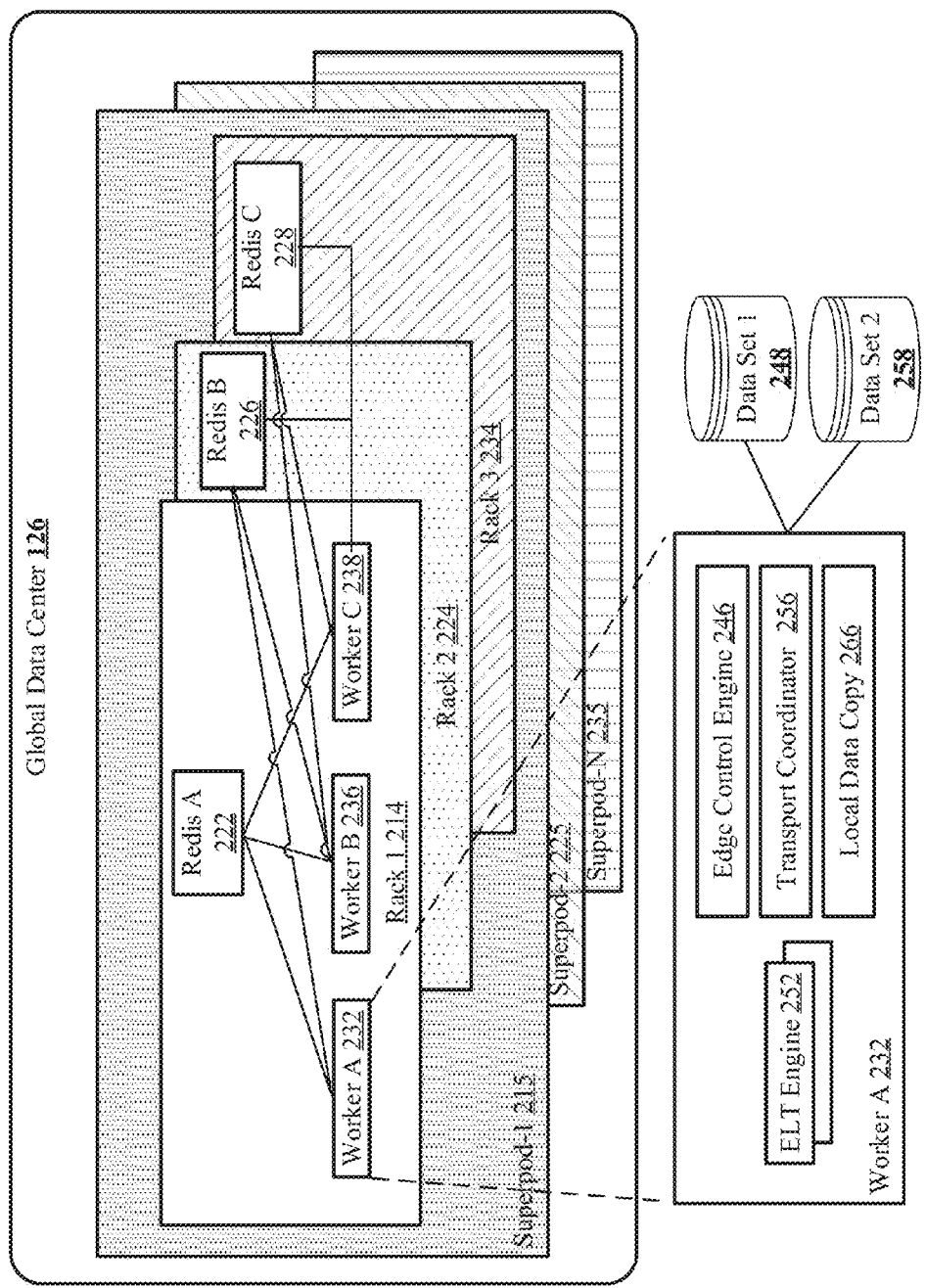
FIG. 2 shows an example global data center block diagram for implementing dynamic allocation of stateful nodes for healing and load balancing, and for rolling version update deployment.

FIG. 2 shows global data center 126 which includes systems of networked racks, referred to as clusters, shown as superpods 215, 225 and 235. Superpod 215 contains rack-1 214, rack-2 224 and rack-3 234, and each rack includes a Redis server node: Redis A 222, Redis B 226 and Redis C 228; and a logical grouping of hosts: worker A 232, worker B 236 and worker C 238 for handling requests. Each superpod includes similar functional blocks. To ensure availability and maximize throughput, all workers in a system of networked racks listen to all Redis nodes for notifications. To meet the need for assured reliability at any time of any day, at least three workers are configured to monitor each Redis node, in one use case.

Continuing the description of FIG. 2, Worker A 232 maintains communication with a process which can implemented as a Zookeeper service, and decides, by analyzing the data from the process, when changes to the allocation of nodes need to be propagated to the worker process executed by edge control engine 246. Extract, load, transform (ELT) engine 252 manipulates data served by backend system servers to populate the data set 1 248 and data set 2 258. Edge control engine 246 listens to the Redis nodes, acting as a traffic arbitrator. In one example, edge control engine 246 handles thirty-two requests in near real time, handing off requests to transport coordinator 256. Transport coordinator 256 executes algorithms for retrieving immutable data sets based on org-affinities for orgs to which the querying devices belong—needed for completing fast queries, and caches the retrieved immutable data sets in local data copy 266. Worker B 236 and Worker C 238 each include similar functional blocks as those described for Worker A 232.

In one implementation, a company allocates a customer to specific racks where their data resides. In common use, multiple customers rely on each rack—a self-contained unit that contains everything required to run an instantiation of a company's services. In one implementation, edge control engine 246 can analyze measured metrics and use the analytics to direct queued tasks to workers.

Figure 3:
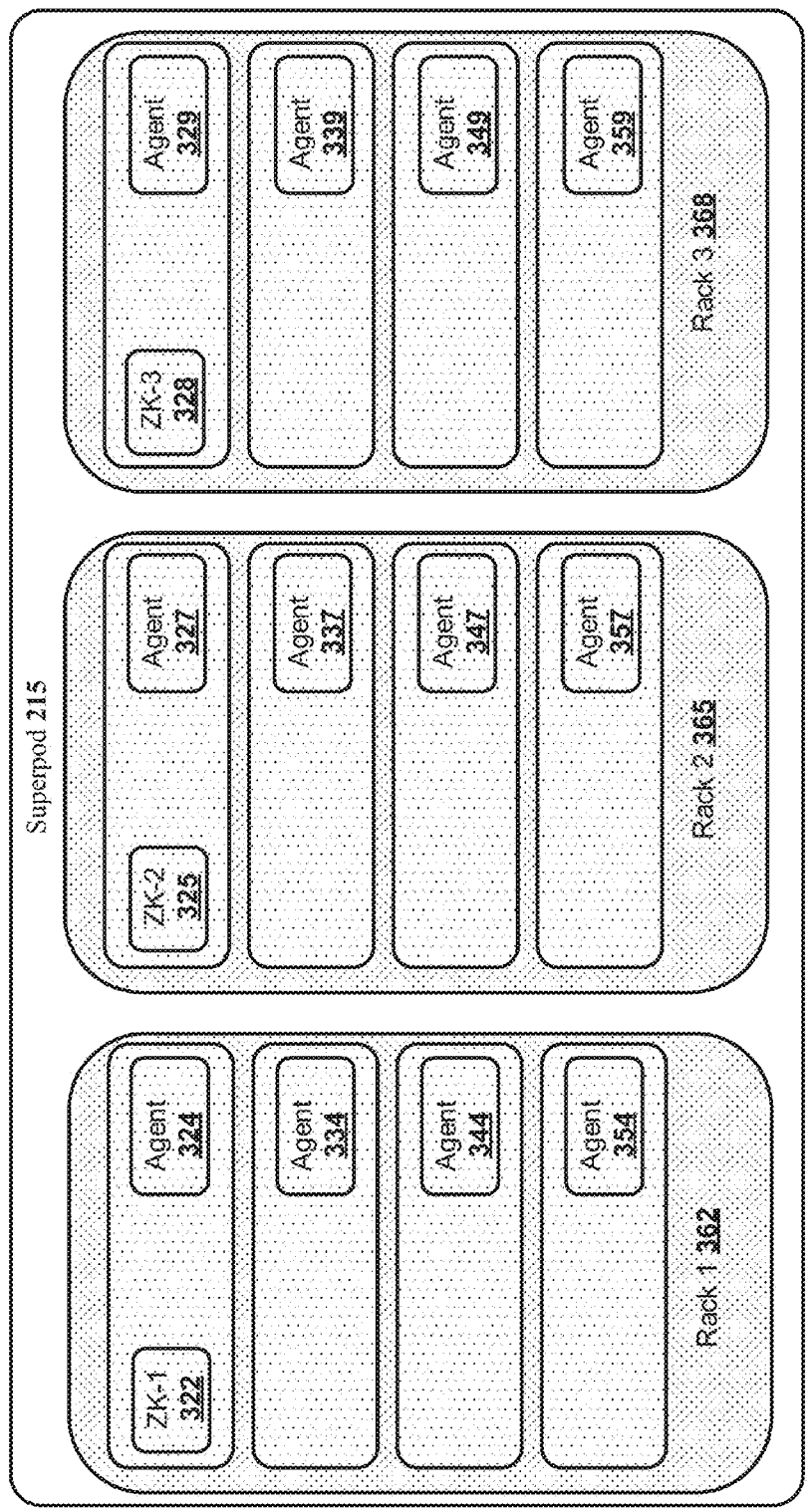
FIG. 3 shows a superpod as a cluster of racks.

FIG. 3 shows superpod 215 as a cluster of racks, including rack 1 362, rack 2 365 and rack 3 368 at startup, with Zookeeper services ZK-1 322, ZK-2 325 and ZK-3 328. Each of the four servers (workers) in each of racks 362, 365 and 368 is booted, and as the servers are booted, a configuration agent boots up and uses the Zookeeper address known to it to register the server with the Zookeeper service. In one implementation of the example of FIG. 3, configuration agents 324, 334, 344 and 354 register with Zookeeper service ZK-1 322. Configuration agents 327, 337, 347 and 357 register with Zookeeper service ZK-2 325. Configuration agents 329, 339, 349 and 359 register with Zookeeper service ZK-3 328. The ZK registrations are coordinated through the current ZK leader. Each of these registered ephemeral znodes exists as long as the session that created the znode is active; and when the session ends, the znode is deleted. After a server registers itself with a Zookeeper service, the server receives an event if the status of the servers in the rack changes.

An example Zookeeper service data model is listed next.

```
/wave-agent 0
  /global-config
  /commands
  /cluster-members
      /iworker4-1-2-chi
      /iworker4-2-2-chi
      /iworker4-3-2-chi
      /iworker4-4-2-chi
  /configs
      /iworker4-1-2-chi
          /commands
          /roles
              /worker [ { State = Initializing | Ready | Updating } ]
                  /actual-config [ {json configuration data} ]
                  /target-config [ {json configuration data} ]
              /redis
```

In one use case, the startup sequence for the configuration agents includes determining the server coordinates within the data center—that is, the superpod and rack coordinates; and connecting to the appropriate Zookeeper service within the specified system of networked racks. The startup sequence also includes checking the local disk to retrieve the existing configuration, for example, after a server restart; and registering a new ephemeral server node in the appropriate Zookeeper service, writing existing configuration information, and setting a watch. Upon notification of an updated configuration, the node can launch a startup sequence for each type of process it needs to run. For example, in the case of a worker node, it can launch edge control services and edge query services. The edge control service can examine the queue configuration, contact Redis, and download any edgemarts that it does not already have locally. Once it has the needed immutable data set files cached locally, the edge control service for a worker can attach to work queues and start pulling query jobs. Atomic locking is implemented to ensure that a single worker pulls and processes a single task from the org-task-queue.

Continuing with the disclosed technology for dynamic node allocation, one of the configuration agents is elected to be leader. The elected configuration leader decides what servers will run what processes, and with what configuration. Many of the servers in the cluster could fulfill the role of leader, but only a single agent will do it at any one time.

Figure 4:
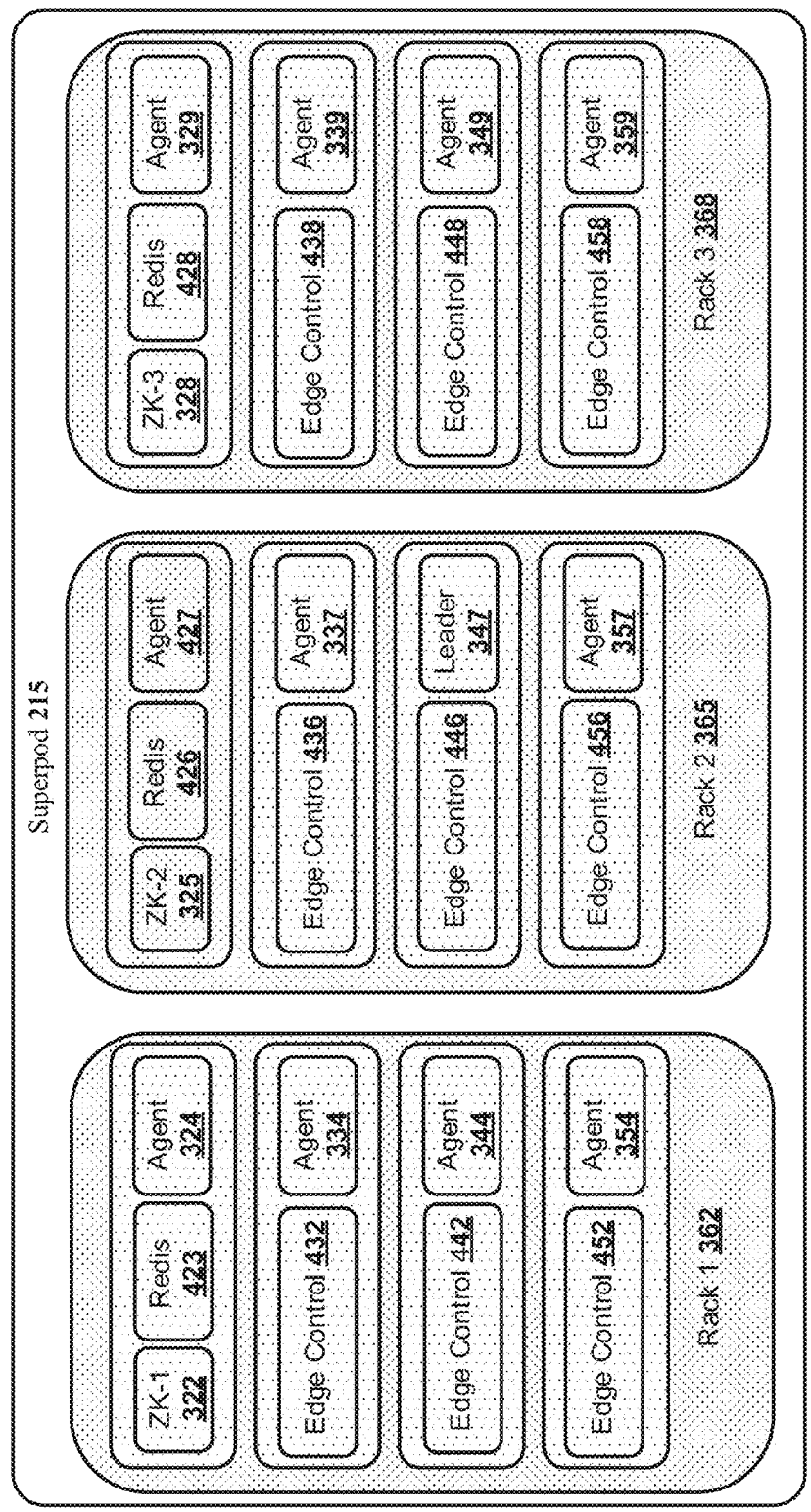
FIG. 4 shows a cluster of racks with org-status-stores (for example, Redis), a leader, configuration agents, a centralized service for maintaining configuration information (for example, Zookeeper) and workers.

The leader process listens for events that signal when changes to the servers root node have occurred. That is, the configuration leader has a dynamic global view of what servers are in the cluster. FIG. 4 shows that agent 347, shown in FIG. 3, has been elected leader 447. Leader 447 puts a watch on the server's root node, so that the leader receives an event from the Zookeeper service when a change happens—such as when a new server is added or other servers are removed. Leader 447 can write configuration changes into the configuration agents of the individual nodes. Because the individual servers are monitoring events, watching for changes, they receive notifications from the Zookeeper services when changes happen. At any single moment in time, a cluster has a single leader for the superpod.

The leader process can write to the nodes for the servers, as appropriate. After leader 447 evaluates the situation based on what servers are active, the leader 447 specifies which servers will have Redis 423, 426 and 428- or an equivalent data structure store as a database, cache and message broker, and which will have edge control processes 432, 442, 452, 436, 446, 456, 438, 448, and 458. Local configuration agents launch and communicate with local edge control processes based on their assigned configurations, with the configuration agents for individual servers watching for events to learn of changes.

The configuration agents in a cluster synchronize with the local edge control processes, which include edge query background processes. For some use cases, to ensure that the configuration agents are synchronized with the edge control processes, each of the background processes can implement a healthy check URL, bound to the local host only. The configuration agent can poll these URLs frequently to ensure that the services continue to report a healthy status. If the node is not able to serve customer requests properly, then the leader 447 will de-register the worker from the cluster, triggering the appropriate cluster reconfiguration for the superpod. If the leader process crashes, a new leader is elected immediately. The new leader process then begins executing the perpetual analysis and update loop to ensure optimal cluster configuration.

Figure 5:
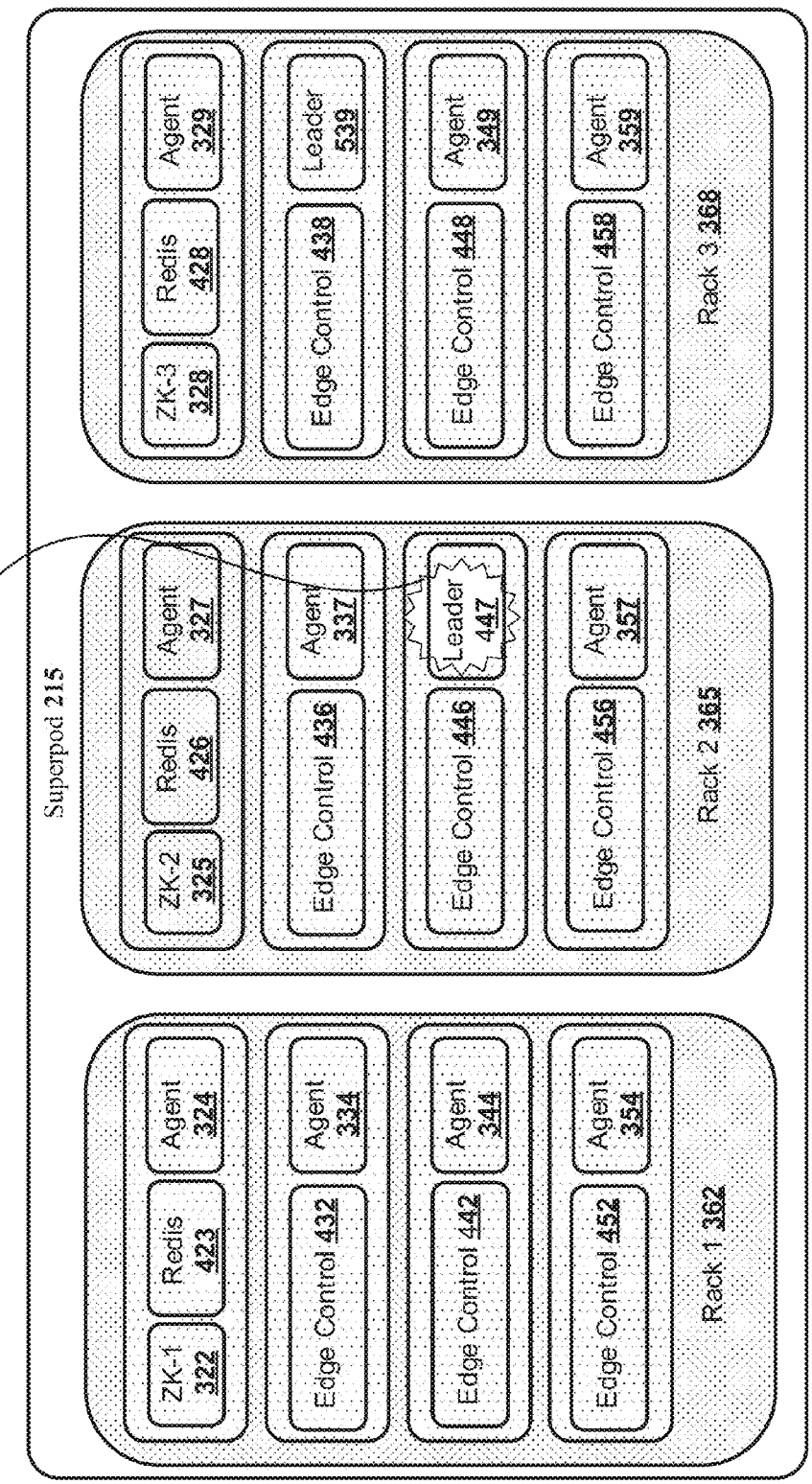
FIG. 5 shows an example of a leader becoming disabled.

The disclosed technology, which includes the described configuration management process and leader election, makes it possible to dynamically manage resource allocation at runtime, without requiring a release process. The disclosed system does not include a single point of failure, which if it fails, will stop the overall cluster from continuing to operate. FIG. 5 shows an example use case scenario in which configuration leader 447 goes offline 515. In this scenario, a new configuration leader 539 gets elected and any load rebalancing for queues is handled by the new leader.

If one or more Zookeeper service nodes in the superpod go offline, the system can reassign the affected Zookeeper services to different servers and shift the work in the affected queues to other worker nodes as needed, without human intervention. This includes cases in which hardware is removed from the cluster. The disclosed technology can automatically adapt and rebalance queues across the remaining hardware. A cluster can lose up to n−2 configuration management service nodes (ZK in one implementation), where n is the number of racks in the system. For the superpod shown in FIG. 5, the number of racks is equal to three, so the system could lose two Zookeeper service nodes and continue to dynamically balance the workload queues among the racks.

Figure 6:
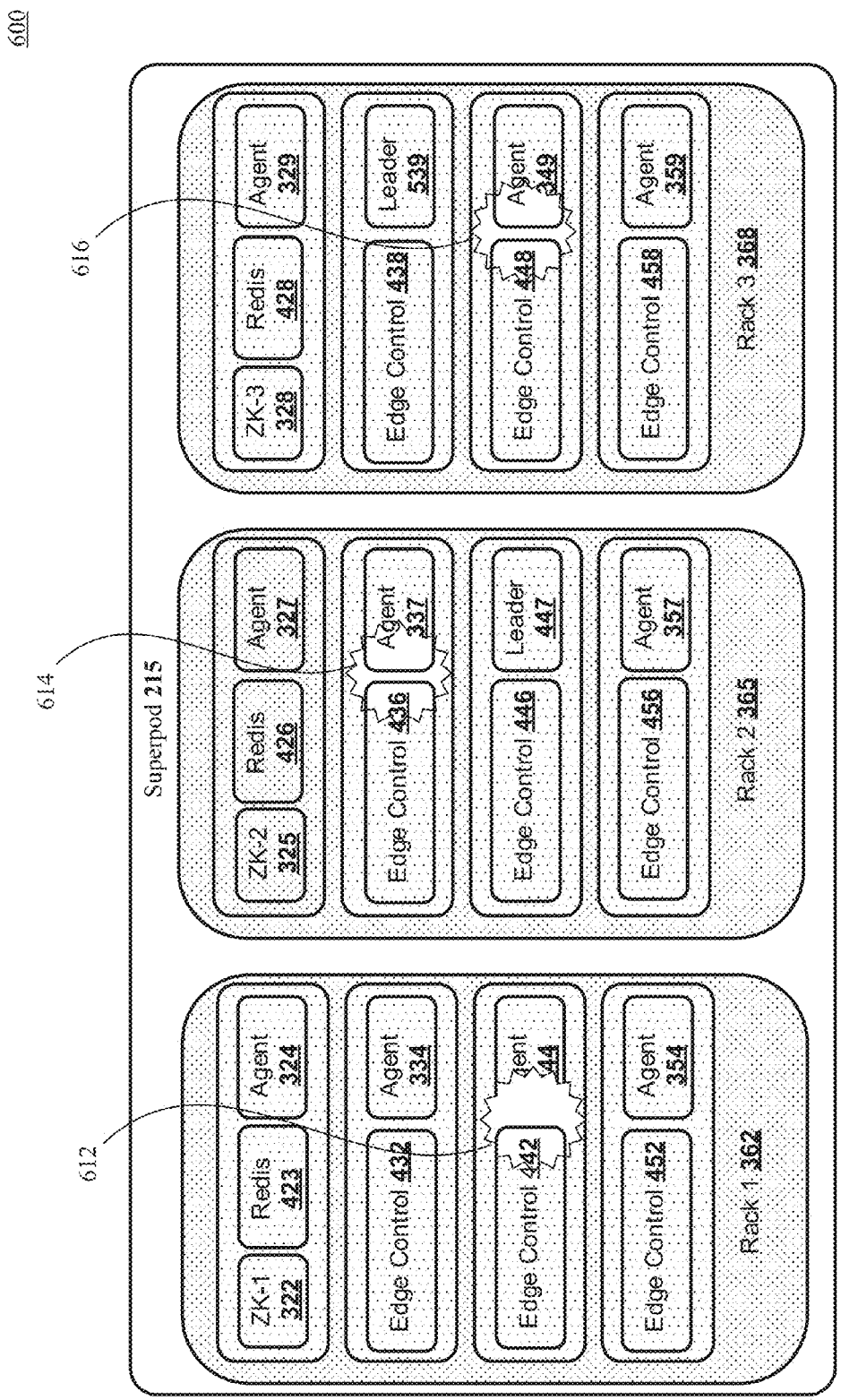
FIG. 6 shows an example in which three workers become unavailable.

FIG. 6 shows a case in which superpod 215 loses one worker 612, 614 and 616 in each of the three racks: edge control 442 and configuration agent 344, edge control process 436 and agent 337, and edge control 448 and agent 349 all go offline. The individual server config nodes are ephemeral nodes so they disappear automatically when the config agent sessions terminate. The leader process notices, and writes updated configurations back to the Zookeeper processes, auto-healing the cluster.

Redundancy levels can be specified for worker queues across multiple servers. In one use case, the disclosed technology includes continuously and automatically maintaining a redundancy level of at least three different worker queue assignments, one on each of three different racks, servicing each node in the cluster. This fault tolerant design makes it viable to tolerate the failure of multiple servers or top of rack (TOR) switches and continue to serve customer requests, though perhaps with degraded performance. In some implementations, redundancy is implemented by implementing workers such that two workers both servicing a specific org will have different lists of org-affinities on disjoint racks.

FIG. 7 shows examples of changes in load distribution for the use case described earlier, based on changes detected. Cluster 722 includes rack 1, rack 2 and rack 3, each of which includes a single active server, so the load is duplicated across the three servers to meet the redundancy requirement of three, specified for the use case. A second cluster 742 includes rack 1, rack 2 and rack 3, each with a single active server, and includes three added racks: rack 4, rack 5 and rack 6, each with a single worker. Note that the load gets balanced across the six servers, with each queue covered on three distinct servers, to meet the redundancy level requirement of three, for the queue. A third server cluster 762 includes six racks, with three workers on rack 1, and a single active server on each of the remaining five racks. Note that the load gets balanced across the three servers of rack 1, and the remaining load gets balanced across rack 2 through rack 6. This example shows one scenario in which the dynamic allocation engine 204 automatically absorbs new capacity and optimizes usage when additional hardware gets added to the cluster.

In some implementations the system can analyze received metrics to monitor for hotspots and attempt to automatically adjust its resource allocation to compensate. The ultimate goal is to maximize hardware utilization in order to minimize the time an end user must wait for a result.

System Flow

Figure 8:
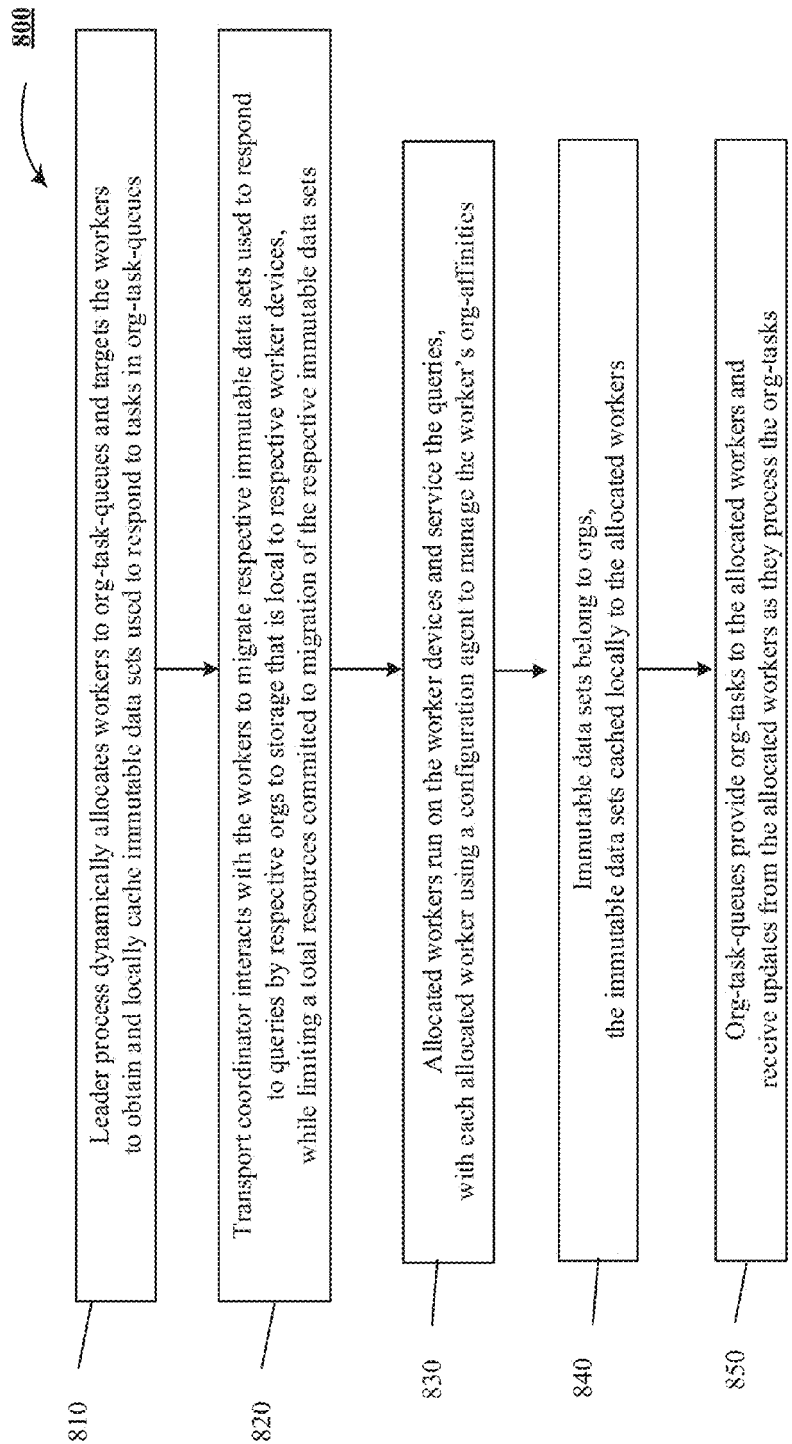
FIG. 8 shows an overview of the flow for a method for implementing dynamic allocation of stateful nodes for healing and load balancing.

FIG. 8 illustrates a flowchart of one implementation 600 of implementing dynamic allocation of stateful nodes for healing and load balancing. Flowchart 800 can be implemented at least partially with a database system, e.g., by one or more processors configured to receive or retrieve information, process the information, store results, and transmit the results. Other implementations may perform the steps in different orders and/or with different, fewer or additional steps than the ones illustrated in FIG. 8. The actions described below can be subdivided into more steps or combined into fewer steps to carry out the method described using a different number or arrangement of steps.

At action 810, the leader process, running on one of the management devices or the worker devices, dynamically allocates workers to org-task-queues and targets the workers to obtain and locally cache immutable data sets used to respond to tasks in org-task-queues.

At action 820, the transport coordinator runs on one of the management devices or the worker devices, with the transport coordinator interacting with the workers to migrate respective immutable data sets used to respond to queries by respective orgs to storage that is local to respective worker devices, while limiting a total resources committed to migration of the respective immutable data sets.

At action 830, allocated workers run on the worker devices and service the queries, each allocated worker using a configuration agent to manage the worker's org-affinities.

At action 840, immutable data sets belong to orgs, the immutable data sets cached locally to the allocated workers.

At action 850, org-task-queues provide org-tasks to the allocated workers and receive updates from the allocated workers as they process the org-tasks.

FIG. 10 illustrates a flowchart of one implementation 600 of implementing rolling version update deployment, with workers on worker devices, org-affinities between the workers and org-task-queues, and a configuration leader running on a worker or management device. Flowchart 1000 can be implemented at least partially with a database system, e.g., by one or more processors configured to receive or retrieve information, process the information, store results, and transmit the results. Other implementations may perform the steps in different orders and/or with different, fewer or additional steps than the ones illustrated in FIG. 10. The actions described below can be subdivided into more steps or combined into fewer steps to carry out the method described using a different number or arrangement of steps.

At action 1010, org-affinities between the workers and the org-task-queues provide access to local copies of org-datasets to service org-tasks from the org-task-queues serviced by the workers.

At action 1020, the configuration leader running on a worker or management device implements a healing and balancing service that maintains worker redundancy, that manages the workers' org-affinities, and that causes workers to accumulate orgs on their respective org-lists and to have heterogeneous org-affinities, such that two workers both servicing a first org can have different lists of org-affinities.

At action 1030, a messaging service, implemented by the configuration leader, messages the workers to update to a new software version and monitoring completion of updates, in cycles.

At action 1040, the configuration leader selects workers to update in a cycle, ensuring that a selected level of worker redundancy to service particular org-task-queues is not compromised, by coordinating the selection of workers taken out of service during the update cycle based on the selected workers' org-affinities.

At action 1050, the configuration leader informs the selected workers in the cycle to proceed with updating.

At action 1060, the configuration leader learns that the selected workers have successfully completed updating, updates version accounting over the selected workers; and moves on to another cycle of updating.

At action 1070, the configuration leader repeats the cycle to update all update-eligible workers.

The technology disclosed can be implemented in the context of any computer-implemented system including a database system, a multi-tenant environment, or the like. Moreover, this technology can be implemented using two or more separate and distinct computer-implemented systems that cooperate and communicate with one another. This technology can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

Multi-Tenant Integration

Figure 9:
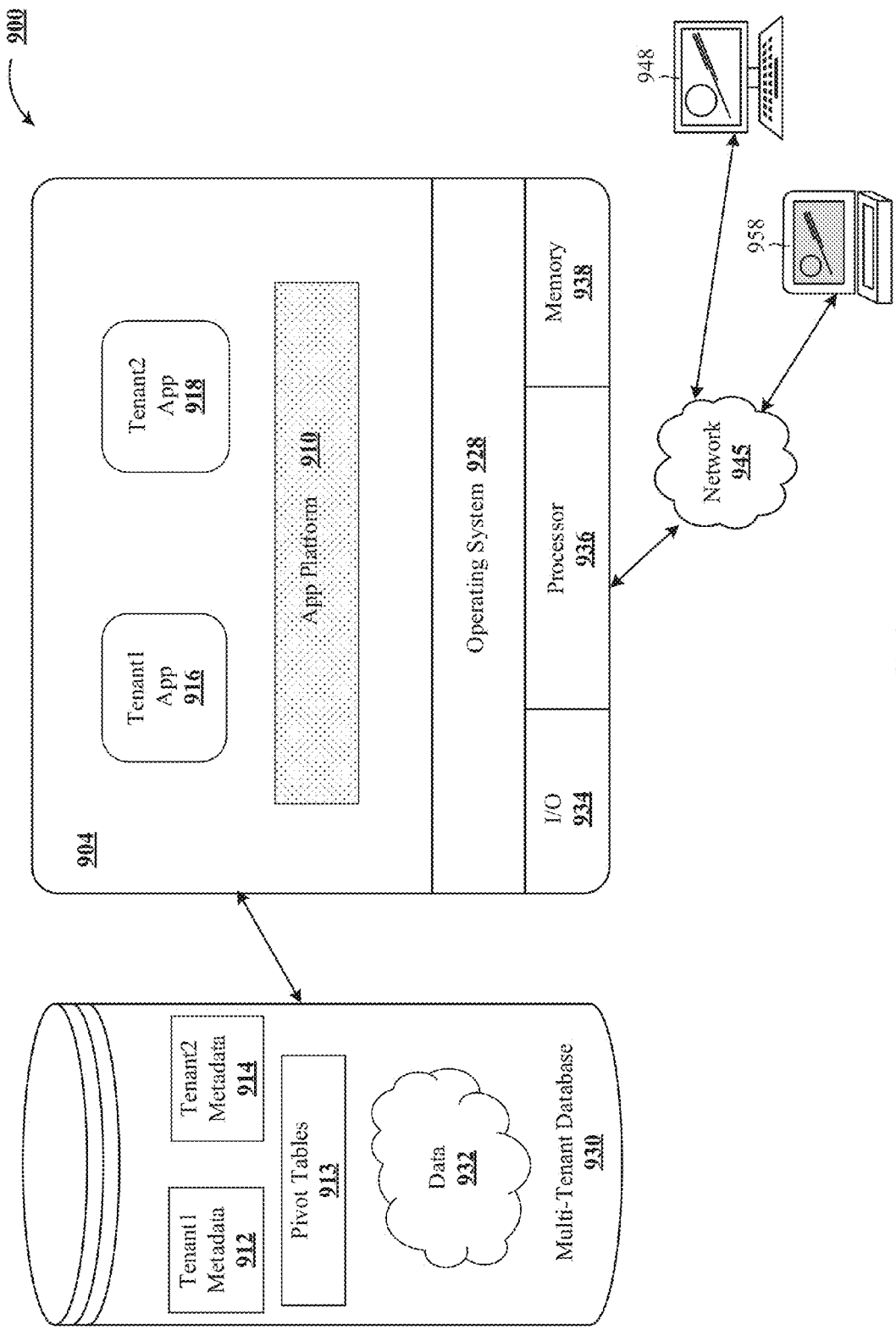
FIG. 9 is a block diagram of an example multi-tenant computer system capable of implementing dynamic allocation of stateful nodes for healing and load balancing.

FIG. 9 presents a block diagram of an exemplary multi-tenant system 900 suitable for implementing dynamic allocation of stateful nodes for healing and load balancing in environment 100 of FIG. 1. In general, the illustrated multi-tenant system 900 of FIG. 9 includes a server 904 that dynamically creates and supports virtual applications 916 and 918, based upon data 932 from a common multi-tenant database 930 that is shared between multiple tenants, alternatively referred to herein as a "multi-tenant database". Data and services generated by the virtual applications 916 and 918, including GUI clients, are provided via a network 945 to any number of client devices 948 or 958, as desired.

As used herein, a "tenant" or an "organization" refers to a group of one or more users that shares access to common subset of the data within the multi-tenant database 930. In this regard, each tenant includes one or more users associated with, assigned to, or otherwise belonging to that respective tenant. Stated another way, each respective user within the multi-tenant system 900 is associated with, assigned to, or otherwise belongs to a particular tenant of the plurality of tenants supported by the multi-tenant system 900. Tenants may represent users, user departments, work or legal organizations, and/or any other entities that maintain data for particular sets of users within the multi-tenant system 900. Although multiple tenants may share access to the server 904 and the database 930, the particular data and services provided from the server 904 to each tenant can be securely isolated from those provided to other tenants. The multi-tenant architecture therefore allows different sets of users to share functionality and hardware resources without necessarily sharing any of the data 932 belonging to or otherwise associated with other tenants.

The multi-tenant database 930 is any sort of repository or other data storage system capable of storing and managing the data 932 associated with any number of tenants. The database 930 may be implemented using any type of conventional database server hardware. In various implementations, the database 930 shares processing hardware with the server 904. In other implementations, the database 930 is implemented using separate physical and/or virtual database server hardware that communicates with the server 904 to perform the various functions described herein. The multi-tenant database 930 may alternatively be referred to herein as an on-demand database, in that the multi-tenant database 930 provides (or is available to provide) data at run-time to on-demand virtual applications 916 or 918 generated by the application platform 910, with tenant 1 metadata 912 and tenant 2 metadata 914 securely isolated.

In practice, the data 932 may be organized and formatted in any manner to support the application platform 910. In various implementations, conventional data relationships are established using any number of pivot tables 913 that establish indexing, uniqueness, relationships between entities, and/or other aspects of conventional database organization as desired.

The server 904 is implemented using one or more actual and/or virtual computing systems that collectively provide the dynamic application platform 910 for generating the virtual applications. For example, the server 904 may be implemented using a cluster of actual and/or virtual servers operating in conjunction with each other, typically in association with conventional network communications, cluster management, load balancing and other features as appropriate. The server 904 operates with any sort of conventional processing hardware such as a processor 936, memory 938, input/output features 934 and the like. The input/output devices 934 generally represent the interface(s) to networks (e.g., to the network 945, or any other local area, wide area or other network), mass storage, display devices, data entry devices and/or the like. User interface input devices 934 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include possible types of devices and ways to input information into server 904.

User interface output devices can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from processor 936 to the user or to another machine or computer system.

The processor 936 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 938 represents any non-transitory short or long term storage or other computer-readable media capable of storing programming instructions for execution on the processor 936, including any sort of random access memory (RAM), read only memory (ROM), flash memory, magnetic or optical mass storage, and/or the like. The computer-executable programming instructions, when read and executed by the server 904 and/or processor 936, cause the server 904 and/or processor 936 to create, generate, or otherwise facilitate the application platform 910 and/or virtual applications 916 and 918, and perform one or more additional tasks, operations, functions, and/or processes described herein. It should be noted that the memory 938 represents one suitable implementation of such computer-readable media, and alternatively or additionally, the server 904 could receive and cooperate with external computer-readable media that is realized as a portable or mobile component or application platform, e.g., a portable hard drive, a USB flash drive, an optical disc, or the like.

The application platform 910 is any sort of software application or other data processing engine that generates the virtual applications 916 and 918 that provide data and/or services to the client devices 948 and 958. In a typical implementation, the application platform 910 gains access to processing resources, communications interfaces and other features of the processing hardware using any sort of conventional or proprietary operating system 928. The virtual applications 916 and 918 are typically generated at run-time in response to input received from the client devices 948 and 958.

With continued reference to FIG. 9, the data and services provided by the server 904 can be retrieved using any sort of personal computer, mobile telephone, tablet or other network-enabled client device 948 or 958 on the network 945. In an exemplary implementation, the client device 948 or 958 includes a display device, such as a monitor, screen, or another conventional electronic display capable of graphically presenting data and/or information retrieved from the multi-tenant database 930.

In some implementations, network(s) 945 can be any one or any combination of Local Area Network (LAN), Wide Area Network (WAN), WiMAX, Wi-Fi, telephone network, wireless network, point-to-point network, star network, token ring network, hub network, mesh network, peer-to-peer connections like Bluetooth, Near Field Communication (NFC), Z-Wave, ZigBee, or other appropriate configuration of data networks, including the Internet.

The foregoing description is merely illustrative in nature and is not intended to limit the implementations of the subject matter or the application and uses of such implementations. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary implementations described herein are not intended to limit the scope or applicability of the subject matter in any way.

The technology disclosed can be implemented in the context of any computer-implemented system including a database system, a multi-tenant environment, or a relational database implementation like an ORACLE™ compatible database implementation, an IBM DB2 Enterprise Server compatible relational database implementation, a MySQL or PostgreSQL compatible relational database implementation or a Microsoft SQL Server compatible relational database implementation or a NoSQL non-relational database implementation such as a Vampire™ compatible non-relational database implementation, an Apache Cassandra™ compatible non-relational database implementation, a BigTable compatible non-relational database implementation or an HBase or DynamoDB compatible non-relational database implementation.

Moreover, the technology disclosed can be implemented using two or more separate and distinct computer-implemented systems that cooperate and communicate with one another. The technology disclosed can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

Particular Implementations

In one implementation, a disclosed system of networked racks, with the racks having management devices and worker devices, includes the system having sufficient management devices to establish a redundancy factor and having management devices redundantly located in disjoint racks; querying devices that query the system for immutable data sets for orgs to which the querying devices belong, wherein the system handles the queries and the immutable data sets based on org-affinities. The disclosed system further includes an org-affinity implemented by data structures linking: allocated workers that run on the worker devices and service the queries from the querying devices, each allocated worker using a configuration agent to manage the worker's org-affinities, immutable data sets that belong to orgs, the immutable data sets cached locally to the allocated workers, and org-task-queues to which the allocated workers listen for org-tasks and to which workers report status updates as they process the org-tasks. The system is further organized with redundant workers allocated to service particular org-task-queues, with the redundant workers for a particular org-task-queue selected to run on worker devices in disjoint racks; and a leader process that runs on one of the management devices or worker devices. The leader process dynamically allocates workers to the org-task-queues and targets the workers to obtain and locally cache the immutable data sets used to respond to tasks in the org-task-queues.

The disclosed system further includes a transport coordinator running on one of the management devices or the worker devices that interact with the workers to migrate respective immutable data sets used to respond to queries by respective orgs to storage local to respective worker devices, while limiting "total resources committed" to migration of the respective immutable data sets. For the disclosed system, the immutable data sets are cached locally within hardware in the rack holding the worker device on which the allocated worker runs. In some implementations, the established redundancy factor has an integer value of at least three. For one implementation, the established redundancy factor is administrator configurable and automatically implemented by the leader process through allocation of new redundant workers or deallocation of existing redundant workers.

For some implementations, a disclosed method of organizing workers in a system includes networked racks, the racks having management devices and worker devices, workers running on the worker devices, an elected leader process running on one of the management devices or the worker devices, and storage local to the workers. The disclosed method includes the leader process running on one of the management devices or the worker devices, with the leader process dynamically allocating workers to org-task-queues and targeting the workers to obtain and locally cache immutable data sets used to respond to tasks in org-task-queues; and a transport coordinator running on one of the management devices or the worker devices, the transport coordinator interacting with the workers to migrate respective immutable data sets used to respond to queries by respective orgs to storage that is local to respective worker devices, while limiting a total resources committed to migration of the respective immutable data sets. For the disclosed method allocated workers run on the worker devices and service the queries, each allocated worker using a configuration agent to manage the worker's org-affinities; immutable data sets belong to orgs, the immutable data sets cached locally to the allocated workers; org-task-queues provide org-tasks to the allocated workers; and receive updates from the allocated workers as they process the org-tasks. For the disclosed method, the immutable data sets are cached locally, at least in the same rack, to the allocated workers.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations.

The disclosed method can further include the leader process detecting that a dead worker is not currently responsive; and the leader process deallocating the dead worker and dynamically allocating other workers to take over the org-task-queues previously serviced by the dead worker.

Some implementations of the method further include the leader determining that the allocated worker cannot properly service the org-task-queues assigned to it; and the leader deregistering the allocated worker from the org-task-queues that it cannot properly service. The method can further include the leader deregistering the allocated worker from the org-task-queues that it cannot properly service.

For some implementations of the disclosed method, a worker working redundantly and flexibly in a system that includes networked racks, the racks having management devices and worker devices, workers running on the worker devices, an elected leader process running on one of the management devices or the worker devices, and storage local to the workers, the method includes the worker running on a worker device in a rack; and the worker receiving from a leader process running on a management or worker device, a dynamic allocation message that targets the worker to service tasks from an org-task-queue and that directs the worker to obtain and locally cache immutable data sets belonging to an org serviced from the org-task-queue. The disclosed method further includes, upon being targeted to a respective org-task-queue, the worker interacts with a transport coordinator running on one of the management or worker devices, from which the worker receives one or more respective immutable data sets used by the worker to respond to queries by a respective org. The method additionally includes the worker processing service tasks including queries from the respective org-task-queue against the migrated respective immutable data sets and returning query response sets and from other org-task-queue assigned to it by the leader process; and the worker reports performance statistics to at least one redundant org-status store that monitor the worker's health and work load for healing and redundancy across workers.

For yet other implementations, the disclosed method further includes the transport coordinator limiting a total resources committed to migration of the respective immutable data sets. The disclosed method includes workers that process service tasks, including queries, from the respective org-task-queue on a first come, first served basis.

In one implementation a disclosed system with rolling version update deployment includes workers on worker devices, the workers maintain org lists of org-task-queues that they service; org-affinities between the workers and the org-task-queues require the workers to have access to local copies of org-data-sets to service org-tasks from the org-task-queues of the orgs that they service; and a configuration leader running on a worker or management device implements a healing and balancing service that maintains worker redundancy, that manages the workers' org-affinities, and that causes workers to accumulate orgs on their respective org-lists and to have heterogeneous org-affinities, such that two workers both servicing a first org can have different lists of org-affinities. In other implementation workers can accumulate orgs on their respective org-lists will have similar lists of org-affinities. The disclosed system further includes a messaging service, implemented by the configuration leader, messaging workers to update from a legacy software version to a new software version and to implement monitoring of completion of updates in a set of update cycles. The configuration leader selects workers to update in a cycle, ensuring that a selected level of redundancy in worker availability to service particular org-task-queues is not compromised, by coordinating the selection of workers taken out of service during the update cycle based on the selected workers' org-affinities. The configuration leader informs the selected workers in the cycle to proceed with updating; and the configuration leader learns that the selected workers have successfully completed updating, updates version accounting over the selected workers; and moves on to another cycle of updating. The configuration leader repeats the cycle to update all update-eligible workers.

Some implementations of the disclosed system further include the worker devices being organized by racks and redundant workers running on worker devices in disjoint racks. In other implementations, the configuration leader suspends the healing and balancing service during updating. The disclosed system can further include satisfying the selected level of worker redundancy in worker availability by updating to the new software version on a rack-by-rack basis; and further includes the worker redundancy maintained by the healing and balancing service having a flexible integer value of at least three redundant workers. In yet other implementations, the configuration leader increases redundancy of workers servicing the org-task-queues with which the selected workers have org-affinities, including provisioning the org-data sets to increased redundancy workers to establish org-affinities. In some implementations, the workers stop taking new tasks, complete pending tasks, shut off services, update to the new software version, restart, and report available for duty. In other implementations of the disclosed system, the workers wait for instructions from an administrator to proceed before reporting available for duty. The human administrator can allow for regression testing before signaling that the workers are ready to restart and report available for duty. For some implementations, the configuration leader for at least one cycle of updating reports results from the cycle of updating and waits for instructions from an administrator to proceed before repeating the cycle of updating.

Some implementations may include a system that includes devices organized in racks, each device including a processor and memory coupled to the processor, the memory loaded with instructions that, when executed, implement the methods described earlier.

Other implementations may include a tangible non-transitory computer readable medium impressed with instructions that are combinable with a processor and memory coupled to the processor. The instructions, when executed on a computer device and one or more servers, perform any of the methods described earlier. In yet other implementations, a tangible non-transitory computer readable medium with instructions that are combinable with a processor and memory coupled to the processor carry out the systems described earlier.

Yet another implementation may include a computing system including at least one server comprising one or more processors and memory, coupled to the processors, containing computer instructions that, when executed on the processors, cause the computing system to perform any of the processes described earlier.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A hardware system with rolling version update deployment, including:

workers on a set of devices in the system, the workers maintain lists of org-task-queues to be serviced by the workers;

org-affinities between the workers and the org-task-queues to provide access to local copies of org-data-sets to service org-tasks from the org-task-queues of orgs serviced by the workers;

a configuration leader running on a device in the set of devices;

a healing and balancing service implemented by the configuration leader that maintains worker redundancy, that manages the workers' org-affinities, and that causes workers to accumulate orgs on their respective org-lists and to have heterogeneous org-affinities;

a messaging service, implemented by the configuration leader, messaging workers to update from a legacy software version to a new software version and to implement monitoring of completion of updates in a set of update cycles including;

the configuration leader selects workers to update in a cycle and ensures that a selected level of worker redundancy to service particular org-task-queues is not compromised by coordinating the selection of workers taken out of service during the update cycle based on the selected workers' org-affinities;

the configuration leader informs the selected workers in the cycle to proceed with updating; and when the configuration leader learns that the selected workers have successfully completed updating, the configuration leader updates version accounting over the selected workers and moves on to another cycle of updating; and the configuration leader repeating the cycle to update all update-eligible workers.

2. The system of claim 1, further including the devices on which the workers run being organized by racks and redundant workers running on devices in disjoint racks.

3. The system of claim 2, further including satisfying the selected level of worker redundancy by updating to the new software version on a rack-by-rack basis.

4. The system of claim 1, further including the configuration leader running on a worker or management device.

5. The system of claim 1, wherein the configuration leader suspends the healing and balancing service during updating.

6. The system of claim 1, wherein the worker redundancy maintained by the healing and balancing service has a flexible integer value of at least three redundant workers.

7. The system of claim 1, wherein the configuration leader increases redundancy of workers servicing the org-task-queues with which the selected workers have org-affinities, including provisioning the org-data sets to increased redundancy workers to establish org-affinities.

8. The system of claim 7, wherein the configuration leader for at least one cycle of updating reports results from the cycle of updating and waits for instructions from an administrator to proceed before repeating the cycle of updating.

9. The system of claim 1, wherein the workers after being informed to proceed with updating, stop taking new tasks, complete pending tasks, shut off services, update to the new software version, restart, and report available for duty.

10. A tangible non-transitory computer readable medium with instructions that are combined with a processor and memory coupled to the processor to construct the system of claim 1.

11. A method of rolling version update deployment, with workers on devices, org-affinities between the workers and org-task-queues, and a configuration leader running on a worker or management device, including:

wherein org-affinities between the workers and the org-task-queues provide access to local copies of org-data-sets to service org-tasks from the org-task-queues serviced by the workers;

implementing, by the configuration leader running on a worker or management device, a healing and balancing service that maintains worker redundancy, that manages the workers' org-affinities, and that causes workers to accumulate orgs on their respective org-lists and to have heterogeneous org-affinities;

messaging workers from a messaging service, implemented by the configuration leader, to update to a new software version and monitoring completion of updates, in cycles including;

selecting workers to update in a cycle, and ensuring that a selected level of worker redundancy to service particular org-task-queues is not compromised, by coordinating the selection of workers taken out of service during the update cycle based on the selected workers' org-affinities;

informing the selected workers in the cycle to proceed with updating; and updating version accounting over the selected workers by the configuration leader, upon learning that the selected workers have successfully completed updating, and moving on to another cycle of updating; and the configuration leader repeating the cycle to update all update-eligible workers.

12. The method of claim 11, further including the devices on which the workers run being organized by racks and redundant workers running on devices in disjoint racks.

13. The method of claim 11, further including the configuration leader satisfying the selected level of worker redundancy in worker availability by updating to the new software version on a rack-by-rack basis.

14. The method of claim 11, wherein the org-data-sets are cached locally, at least in the same rack, to the workers that service the org-task-queues of the orgs.

15. The method of claim 11, wherein the configuration leader suspends the healing and balancing service during updating.

16. The method of claim 11, wherein the worker redundancy maintained by the healing and balancing service has a flexible integer value of at least three redundant workers.

17. The method of claim 11, wherein the configuration leader increases redundancy of workers servicing the org-task-queues with which the selected workers have org-affinities, including provisioning the org-data sets to increased redundancy workers to establish org-affinities.

18. The method of claim 11, wherein the workers after being informed to proceed with updating, stop taking new tasks, complete pending tasks, shut off services, update to the new software version, restart, and report available for duty.

19. The method of claim 11, wherein the configuration leader for at least one cycle of updating reports results from the cycle of updating and waits for instructions from an administrator to proceed before repeating the cycle of updating.

20. A tangible non-transitory computer readable medium with instructions that implement the method of claim 11.

21. A hardware system including devices organized in racks, each device including a processor and memory coupled to the processor, the memory loaded with instructions that implement the method of claim 11.

* * * * *